US010877763B2

(12) United States Patent
Lloyd et al.

(10) Patent No.: US 10,877,763 B2
(45) Date of Patent: Dec. 29, 2020

(54) DISPATCHING, ALLOCATING, AND DEALLOCATING INSTRUCTIONS WITH REAL/VIRTUAL AND REGION TAGS IN A QUEUE IN A PROCESSOR

(71) Applicant: International Business Machines Corporation, Armonk, NY (US)

(72) Inventors: Bryan Lloyd, Austin, TX (US); Brian D. Barrick, Pflugerville, TX (US); Kurt A. Feiste, Austin, TX (US); Hung Q. Le, Austin, TX (US); Dung Q. Nguyen, Austin, TX (US); Kenneth L. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/052,751

(22) Filed: Aug. 2, 2018

(65) Prior Publication Data
US 2020/0042319 A1   Feb. 6, 2020

(51) Int. Cl.
*G06F 9/38*        (2018.01)
*G06F 12/0875*     (2016.01)
*G06F 9/30*        (2018.01)

(52) U.S. Cl.
CPC ........ *G06F 9/3836* (2013.01); *G06F 9/30043* (2013.01); *G06F 12/0875* (2013.01); *G06F 2212/452* (2013.01)

(58) Field of Classification Search
CPC ............................ G06F 9/3855; G06F 9/3836
See application file for complete search history.

(56) References Cited

U.S. PATENT DOCUMENTS

| 6,782,461 | B2 | 8/2004 | Lam |
| 7,519,796 | B1* | 4/2009 | Golla .................... G06F 9/3814 712/225 |
| 8,006,075 | B2 | 8/2011 | Luttrell |
| 8,713,263 | B2 | 4/2014 | Bryant |
| 9,778,872 | B2 | 10/2017 | Yoshioka et al. |
| 2003/0182537 | A1* | 9/2003 | Le ......................... G06F 9/3824 712/216 |

(Continued)

FOREIGN PATENT DOCUMENTS

WO     2013188705 A2    12/2013

*Primary Examiner* — Jacob Petranek
(74) *Attorney, Agent, or Firm* — Scully, Scott, Murphy & Presser, P.C.

(57) ABSTRACT

A computer system, processor, and method for processing information is disclosed that includes a Dispatch Unit for dispatching instructions; an Issue Queue for receiving instructions dispatched from the Dispatch Unit; and a queue for receiving instructions issued from the Issue Queue, the queue having a plurality of entry locations for storing data. In an embodiment instructions are dispatched with a virtual indicator, and the virtual indicator is set to a first mode for instructions dispatched where an entry location is available, and to a second mode where an entry location is not available, in the queue to receive the dispatched instruction. In addition to virtual tagging dispatched instructions, a system, processor, and method are disclosed for regional partitioning of queues, region based deallocation of queue entries, and circular thread based assignment of queue entries.

18 Claims, 10 Drawing Sheets

(56) References Cited

U.S. PATENT DOCUMENTS

| | | | |
|---|---|---|---|
| 2003/0182540 A1* | 9/2003 | Burky | G06F 9/3824 |
| | | | 712/225 |
| 2008/0082794 A1 | 4/2008 | Yu et al. | |
| 2010/0161945 A1* | 6/2010 | Burky | G06F 9/3834 |
| | | | 712/215 |
| 2017/0199822 A1 | 7/2017 | Avudaiyappan et al. | |
| 2018/0307492 A1* | 10/2018 | Di | G06F 9/3836 |
| 2019/0087195 A1* | 3/2019 | Lloyd | G06F 9/30189 |

* cited by examiner

DISPATCHING, ALLOCATING, AND DEALLOCATING INSTRUCTIONS WITH REAL/VIRTUAL AND REGION TAGS IN A QUEUE IN A PROCESSOR

BACKGROUND OF INVENTION

The present invention generally relates to information handling and data processing systems, processors, and more specifically to load and store queues in processors.

Modern information and data handling systems often execute instructions out of order to achieve greater processing efficiency. Such processors typically are "pipelined" and have multiple elements which operate in parallel to process multiple instructions in a single processing cycle. Pipelining involves processing instructions in stages, so that the pipelined stages may process a number of instructions concurrently.

Typically the processor includes a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually register files and queues associated with the execution units and/or the issue queue (ISQ) to hold data, information and/or instructions for the execution units.

In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer. Another design to improve throughput may be to include multiple hardware threads within each processor core, with the threads sharing certain resources of the processor core. This may allow each processor core to take advantage of thread-level parallelism. To handle multiple threads in each processor core, a processor core may have multiple execution slices. An execution slice may refer to a set of data processing circuitry or hardware units connected in series within a processor core. An execution slice may be a pipeline or pipeline-like structure. Multiple execution slices may be used as part of simultaneous multi-threading within a processor core.

SUMMARY

The summary of the disclosure is given to aid understanding of a computer system, computer architectural structure, processor, load and store queues, and method of using load and store queues in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, load and store queues, and their method of operation to achieve different effects.

Certain aspects of the present disclosure provide a method of processing data in a processor that includes dispatching an instruction, preferably from a Dispatch Unit, to an Issue Queue with a virtual indicator, e.g., a wrap bit; setting the virtual indicator to a first mode for instructions where an entry location in a queue is available to receive an instruction; setting the virtual indicator to a second mode where the entry location in the queue is not available to receive the instruction; and changing the virtual indicator from a second mode to a first mode when the entry location in the queue is deallocated and available to receive the instruction. In an embodiment, the method includes dispatching the instruction to the Issue Queue stamped with an entry location identifier that identifies the entry location in the queue to which the instruction is to be issued. The queue in an aspect is in an execution unit of a processor, and the execution unit in an embodiment is a load store unit and the queue is at least one of the group consisting of a load queue, a store queue, and combinations thereof. The method in an embodiment includes holding instructions in the Issue Queue when the virtual indicator is in a second mode and releasing instructions held at the Issue Queue to the queue in response to the Issue Queue changing the virtual indicator from the second mode to the first mode.

The method according to an embodiment includes the Dispatch Unit indicating to the Issue Queue when an instruction entry in the queue is deallocated, and in response the Issue Queue changes the virtual indicator to the second mode for any instruction held at the Issue Queue that has a tag that corresponds to the deallocated entry in the queue. The method in a further aspect includes dispatching the instruction to the Issue Queue with a region indicator that identifies a region of the queue to which the instruction is to be issued, wherein the region comprises a plurality of entry locations within the queue, and releasing entry locations by regions wherein all entry locations in a region are deallocated together.

In a further embodiment, a computer system for processing information is disclosed. The computer system includes at least one computer processor that has a Dispatch Unit for dispatching instructions; an Issue Queue for receiving instructions dispatched from the Dispatch Unit; and a queue for receiving instructions issued from the Issue Queue, the queue having a plurality of entry locations for storing data. In an embodiment, the Dispatch Unit is configured to dispatch instructions with a virtual indicator, and the virtual indicator is set to a first mode for instructions dispatched where an entry location is available in the queue to receive the dispatched instruction, and the virtual indicator is set to a second mode for instructions dispatched where an entry location is not available in the queue to receive the dispatched instruction. In an aspect, the Issue Queue is configured to perform one or more of: (a) issuing instructions to the queue when the virtual indicator is set to a first mode and to hold instructions when the virtual indicator is set to a second mode, (b) changing the virtual indicator from a second mode to a first mode in response to the entry location in the queue being deallocated and available to receive the instruction, and (c) releasing instructions held at the Issue Queue to the queue in response to changing the virtual indicator from a second mode to a first mode. The Dispatch Unit in an embodiment is configured to dispatch the instruction to the Issue Queue with an entry location identifier that identifies the entry location in the queue to which the instruction is to be issued, and in an aspect, the entry location identifier is a six bit field and the virtual indicator is a single wrap bit field. According to a further aspect, the Dispatch Unit is further configured to dispatch instructions to the Issue Queue with a region indicator that identifies a region of the queue to which the instruction is to be issued, wherein the region comprises a plurality of entry locations within the queue, and the Dispatch Unit in an embodiment is also configured to indicate to the Issue Queue which region of the queue is available to receive instructions.

The computer system according to another aspect includes at least one processor; a Dispatch Unit for dispatching instructions; an Issue Unit for receiving instructions dispatched from the Dispatch Unit and for issuing instructions; a queue of an execution unit for receiving instructions issued from the Issue Queue, the queue having a plurality of entry locations for storing data; one or more computer readable non-transitory storage media; and programming instructions stored on the one or more computer readable non-transitory storage media for execution by the at least one processor, the programming instructions comprising: programming instructions to dispatch instructions to the Issue Queue with a virtual indicator; programming instructions to set the virtual indicator to a first mode for instructions dispatched where an entry location is available in the queue to receive the dispatched instruction, and the virtual indicator is set to a second mode for instructions dispatched where an entry is not available in the queue to receive the dispatched instruction; programming instructions to issue instructions to the queue in response to the virtual indicator being set to the first mode and to hold the instructions at the Issue Queue in response to the virtual indicator being set to the second mode; and programming instructions to change the virtual indicator from a first mode to a second mode in response to the entry location in the queue being deallocated and available to receive an instruction. The computer system may further include programming instructions to stamp instructions dispatched to the Issue Queue with an entry location identifier that identifies the entry location in the queue to which the instruction is to be issued, and a region indicator that identifies the region of the queue to which the instruction is to be issued, wherein the region comprises a plurality of entry locations within the queues, and further including programming instructions to deallocate and release entry locations on a region by region basis.

BRIEF DESCRIPTION OF THE DRAWINGS

The various aspects, features and embodiments of the information handling system, computer system, computer architectural structure, processor, load and store queues, and their method of operation will be better understood when read in conjunction with the figures provided. Embodiments are provided in the figures for the purpose of illustrating aspects, features and/or various embodiments of the computer system, computer architectural structure, processor, load and store queues, and their method of operation, but the claims should not be limited to the precise arrangement, structures, features, aspects, embodiments or devices shown, and the arrangements, structures, subassemblies, features, aspects, methods, processes, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, execution units such as, for example, a load store unit (LSU), load and store queues, and their method of operation, however, it will be understood by those skilled in the art that different and numerous embodiments of the computer system, computer architectural structure, processor, load store unit (LSU), load and store queues, and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of execution units such as load store units (LSUs), and load and store queues. It may be noted that a numbered element is numbered according to the figure in which the element is introduced, and is typically referred to by that number throughout succeeding figures.

Figure 1:
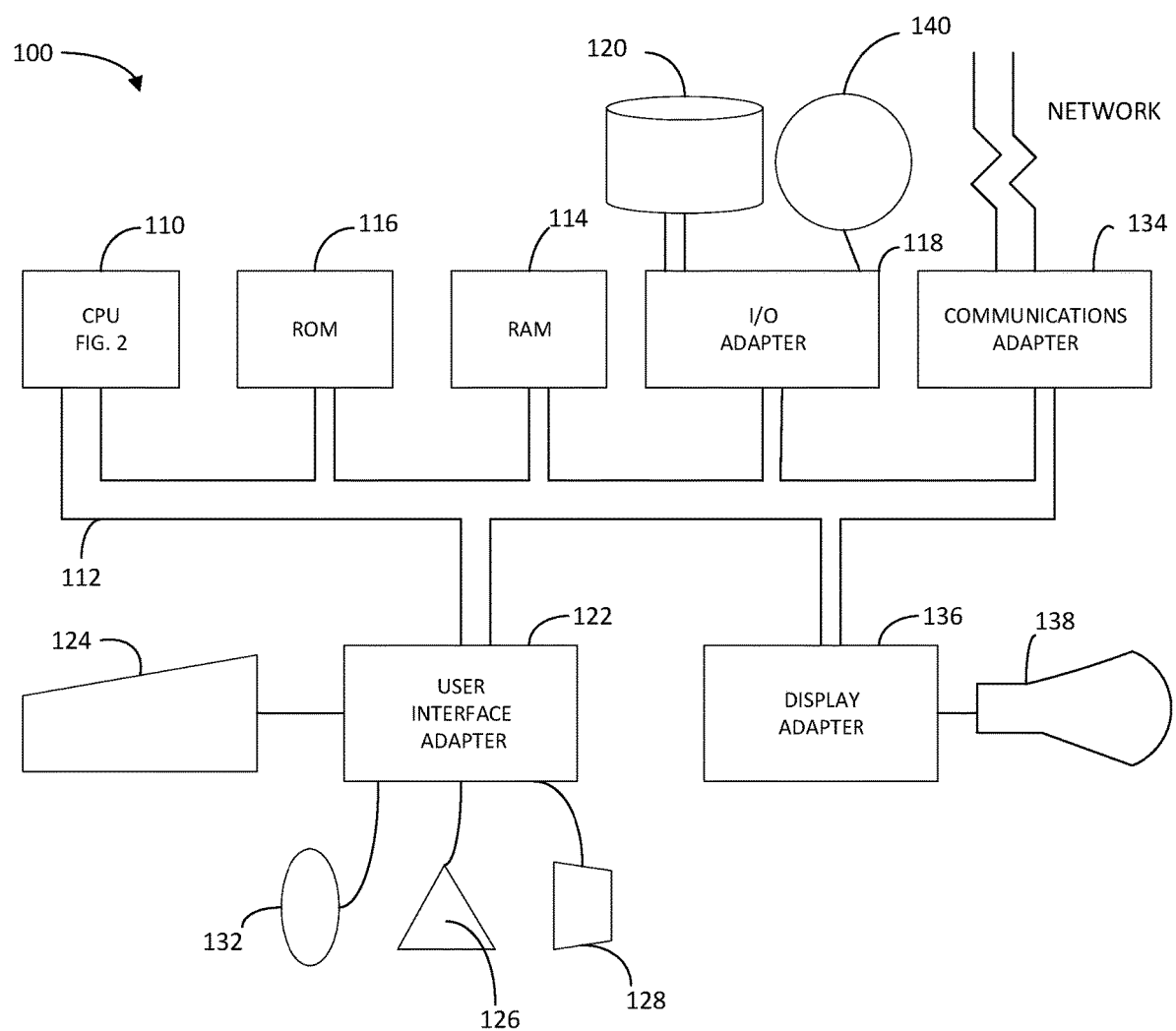
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
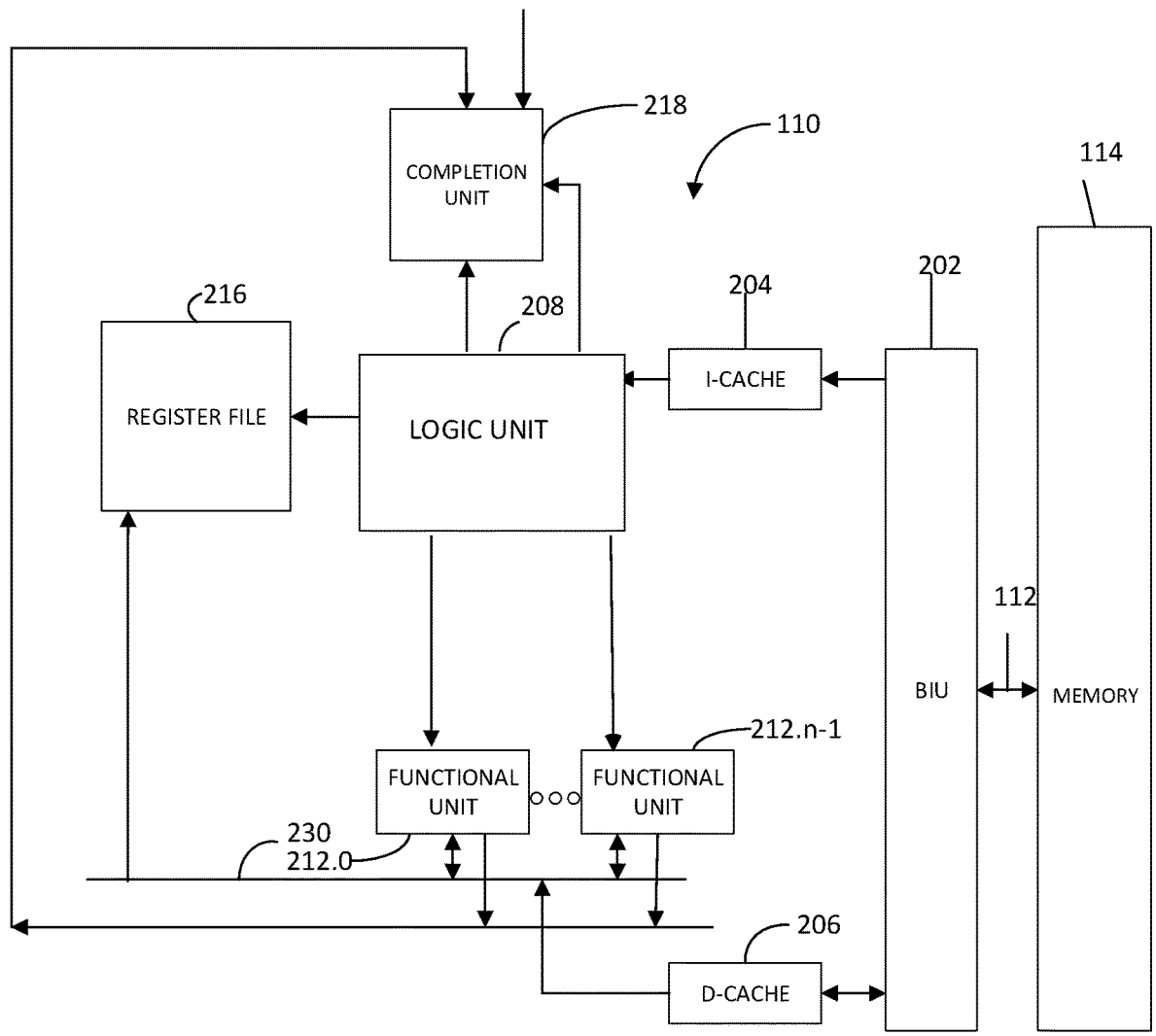
FIG. 2 illustrates a block diagram of a processor in which certain aspects of the present disclosure may be practiced.

FIG. 2 illustrates a block diagram of a processor 110 in which certain aspects of the present disclosure may be practiced. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206. Data cache 206 and instruction cache 204 may have various levels of cache such as for example, L1 cache, L2 cache, and/or L3 cache.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the previously described stages are indicated as a single logic unit 208 in FIG. 2 for the sake of simplicity of understanding, and further detail as relevant will be provided below.

Logic unit 208 in FIG. 2 includes fetch, branch processing, instruction buffer, decode and dispatch units. The logic unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by a branch processing unit. The logic unit 208 also decodes the instructions and dispatches them to an appropriate functional unit (e.g., execution unit) 212.0, 212.1, . . . 212.n−1. In executing the instructions, the functional units 212 input and output information to registers (shown collectively as register file 216). The functional units 212 signal the completion unit 218, e.g., Instruction Completion Table, upon execution of instructions and the completion unit 218 retires the instructions. The processor may include a history buffer (not shown) to save a processor state before, for example, an interruptible instruction, so that if an interrupt occurs, control logic may recover the processor state to the interrupt point by restoring the content of registers. In an aspect, functional units 212 also assert results on one or more result buses (e.g. write back buses) 230 so that the results may be written to the register entries in the register file 216.

In certain aspects, a CPU 110 may have multiple execution/processing slices with each slice having one or more of the units shown in FIG. 2. For example, each processing slice may have its own logic unit 208, register file 216, and functional/execution units 212. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor.

Figure 3:
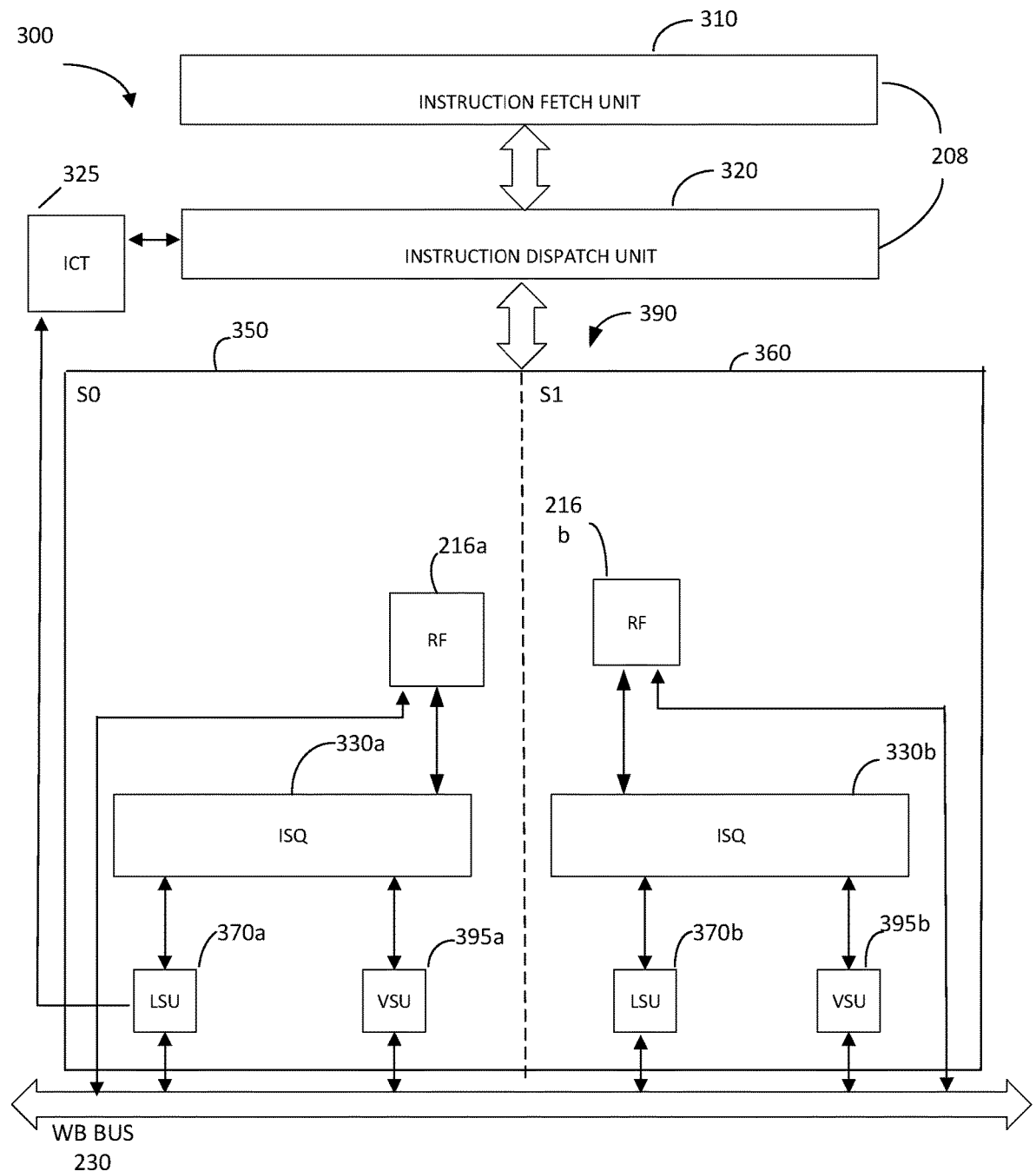
FIG. 3 illustrates a block diagram of a multi-slice processor in accordance with an aspect of the disclosure in which certain aspects of the present disclosure may be practiced.

FIG. 3 illustrates a diagram of a multi-slice processor 300 in accordance with an embodiment of the present disclosure. It may be noted that FIG. 3 only shows portions of the multi-slice processor 300 in diagrammatic fashion for purpose of discussion. It will be appreciated that the multi-slice processor may have other configurations. Processor 300 includes, Instruction Fetch Unit 310, Instruction Dispatch Unit 320, Instruction Completion Table (ICT) 325, processing slices 350 and 360, and write back bus 230. As shown in FIG. 3, the multi-slice processor 300 in an embodiment includes two processing slices-even Slice 0 (slice S0 or 350) and odd Slice 1 (slice S1 or 360). Processor 300 may include more or less processing slices. Each of the slices 350 and 360, e.g., even processing slice S0 and odd processing slice S1, include an issue queue (ISQ) (330a and 330b), execution units 370 and 395, and a register file (RF) (216a and 216b). In the embodiment of FIG. 3, the execution units may include load store units (LSU) (370a and 370b), and vector scalar units (VSU) (395a and 395b). The execution units 370 and 395 may perform the operation specified by an instruction dispatched to execution slices 350 and 360. The register file 216 may serve to store data to be used in an operation specified in an instruction dispatched to execution slice 350, and the result of the operation performed by execution units 304a and 306a may be written to the designated target register in register file 216. Execution units 370 and 395 are illustrated as LSU execution units and VSU execution units, but execution units may include, for example, one or more load store units (LSU), one or more vector scalar units (VSU), one or more arithmetic logic units (ALU), one or more fixed point units (FXU), one or more floating point units (FPU), one or more vector multimedia units (VMU), and/or one or more permutation units (PERM), as well as other functional and execution units.

As shown in FIG. 3, logic unit 208 may include instruction fetch unit 310 and instruction dispatch unit 320 to perform instruction fetch and dispatch for the multi-slice processor. In an aspect, the slices S0 and S1 (slices 350, 360) may share one physical register file 216 having an array of general purpose registers (GPRs). In certain aspects, the ISQ 330 holds a set of instructions and the register file accumulates data for the instruction inputs. When an instruction is dispatched by instruction dispatch unit 320, the ISQ 330 may allocate a register file (RF) entry for the instruction. The source RF entries required as input for the instruction are looked up and passed on to the appropriate register file, e.g., general purpose register (GPR). When all source data accumulates for the instruction, the data is passed on to one or more execution units designated for execution of the instruction. Each of the LSUs 370 and VSUs 395 may make result data available on the write back bus 230 for writing into an RF entry. In an aspect, each of the LSUs 370 and VSUs 395 may have a corresponding WB bus 230. It may be noted that two slices are shown for ease of illustration and discussion only, and that multi-slice processor 400 may include more than two processing or execution slices with each slice having all of the components discussed above, or alternative components for each of the slices S0 and S1 (slices 350 and 360). Further, the processing slices may be grouped into super slices (e.g., SS 390), with each super slice including a pair of processing slices. For example, a multi-slice processor may include two super slices SS0 and SS1, with SS0 including slices S0 and S1, and SS1 (not shown) including slices S2 and S3.

The processor core may include other circuits, functional units, and components. At the designated time, the dispatch unit 320 may dispatch a given instruction to the designated instruction slice, e.g., slice 350 or slice 360. The designated execution slice 350 or 360 may then process the instruction. Once processed, the result of the instruction may be transferred through write back routing network (bus) 230, and written to registers within the register file 216.

In certain aspects, the slices S0 and S1 of the multi-slice processor 400 may be configured to simultaneously execute independent threads (e.g., one thread per slice) in a simultaneous multi-threading mode (SMT). Thus, multiple threads may be simultaneously executed by the multi-slice processor 300. For example, in a multi thread mode, threads T0 and T1 may execute in SS0 and threads T2 and T3 may execute in SS1 (not shown). Further, in a single thread (ST) mode, instructions associated with a single thread may be executed simultaneously by the multiple processing slices of at least one super slice, for example, one instruction per slice simultaneously in one processing cycle. Simultaneous processing in multiple slices may considerably increase processing speed of the multi-slice processor 300.

Processor cores use various techniques for allocating resources dedicated to tracking load and store instructions within the load store execution unit (LSU) of the processor. In an embodiment, the load store unit (LSU) contains a store queue (STQ) of n entries of store instructions and contains a load queue (LDQ) of m entries of load instructions. The store queue (STQ) entries and the load queue (LDQ) entries are assigned (allocated) in program order typically at dispatch, e.g., by the dispatch unit, if the entries in the queues are available. Store queue (STQ) entries typically are freed up (deallocated) when the store instructions have executed and the stores have drained into the L1 processor cache (and/or the L2 processor cache). Load queue (LDQ) entries typically are freed up (deallocated) when the loads have completed (retired) and have entirely executed within the processor core.

The assignment (allocation) and deallocation of load instructions to the load queue (LDQ) and store instructions to the store queue (STQ) traditionally consumes a significant amount of resources, e.g., hardware resources, to track which queue entries are free for reuse. The disclosure simplifies allocation and deallocation of queue entries, e.g., LDQ and SRQ entries, compared to traditional designs and optimizes reuse of those entries with minimal tracking by utilizing one or more disclosed techniques, methods, configurations, systems, architectures, logic programming, and embodiments.

One embodiment optimizes fast reuse of queue entries, e.g., STQ and LDQ entries, with minimal tracking, including minimal tracking hardware, by using virtual tagging. Another embodiment optimizes fast reuse of queue entries, e.g., STQ and LDQ entries, with minimal tracking, including minimal tracking hardware, by using circular thread based assignment of queue entries, e.g., LDQ and STQ entries. Yet another embodiment optimizes fast reuse of queue entries, e.g., STQ and LDQ entries, with minimal tracking, including minimal tracking hardware, by using region-based deallocation of queue entries. Embodiments may use one or more, or all of the techniques, methods, configurations, features, systems, programming logic and architectures disclosed. For example, an embodiment optimizes fast reuse of queue entries, e.g., STQ and LDQ entries, with minimal tracking, including minimal tracking hardware, by using virtual tagging, region based deallocation, and/or circular thread based assignment of queue entries, e.g., LDQ entries and STQ entries.

Figure 4:
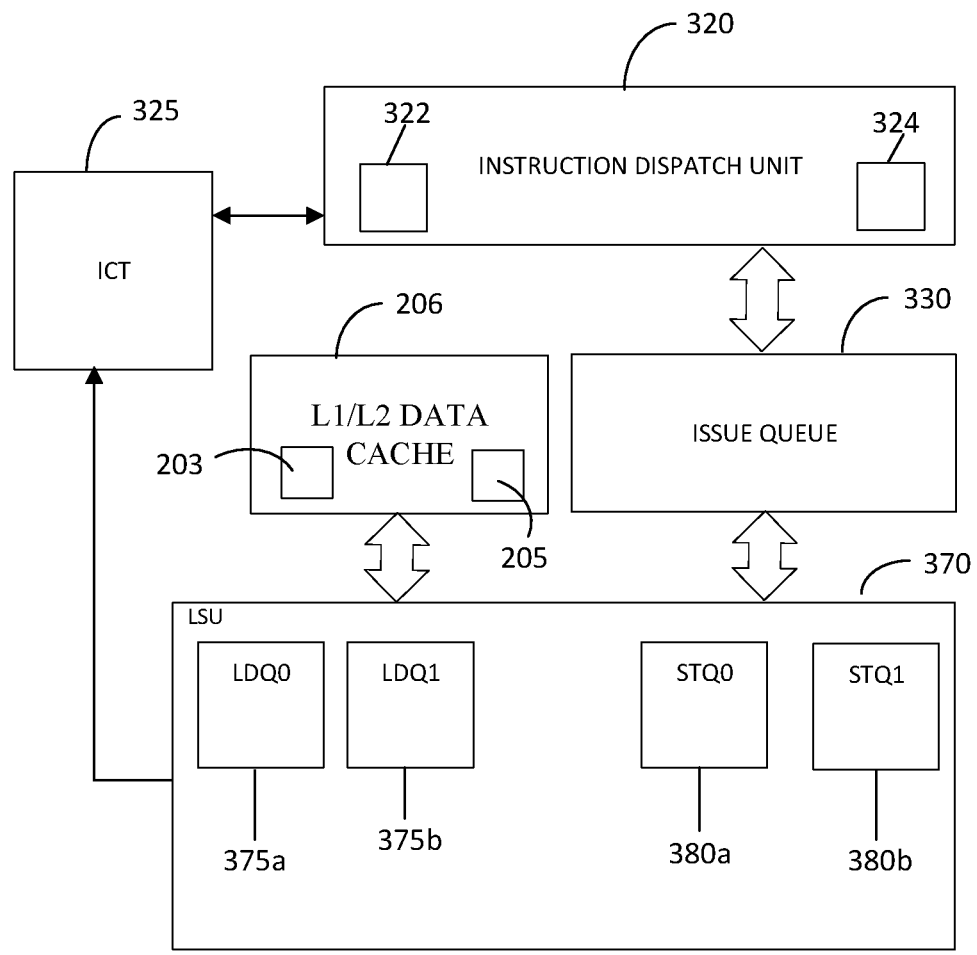
FIG. 4 illustrates portions of a processor in accordance with an aspect of the present disclosure in which certain aspects of the present disclosure may be practiced.

FIG. 4 illustrates a portion of a processor pipeline. Processor pipeline 400 in FIG. 4 includes Instruction Dispatch Unit 320, Issue Queue (ISQ) 330, Instruction Completion Table (ICT) 325, L1/L2 Data Cache 206, and Load Store Unit (LSU) 370. The LSU 370 includes one or more load queues (LDQ) 375 that hold load instructions, and one or more store queues (STQ) 380 that hold store instructions. The load and store queues may be designed and configured to have varying amounts of entries. For example, in an embodiment, load queues (LDQ) 375 may have sixty-four (64) entries, while in an embodiment, store queues (STQ) 380 may have forty (40) entries. In an embodiment more or less load queue (LDQ) entries and store queue (SDQ) entries may be provided.

The Instruction Dispatch Unit 320 dispatches instructions to the Issue Queue (ISQ) 330, typically in program order. The Issue Queue (ISQ) 330 will issue load and store instructions to the LSU 370, and more particularly will issue load instructions to the load queue (LDQ) 375 and store instructions to the store queue (STQ) 380 in the LSU 370. The ISQ 330 typically holds an instruction until data associated with the instruction has been retrieved and ready for use. For example, when data has been retrieved and placed in L1/L2 data cache 206, e.g., L1 cache 203 or L2 cache 205, associated with the processor. When data is not ready, e.g., within the appropriate data cache, delay can result as the ISQ 330 will not issue the instruction to the execution unit. For at least this reason, the Issue Queue (ISQ) typically issues instructions, e.g., load and store instructions, to the execution units, e.g., LSU 370, out of order so instructions where the required data is available can be executed. In addition, if the load queue (LDQ) 375 is full, the ISQ 330 will not issue load instructions to the LSU 370, and if the store queue (STQ) 380 is full the ISQ 330 will not issue store instructions to the LSU 370. If the load queue (LDQ) and/or store queue (STQ) are full, then the LSU 370 needs to release entry locations, and in an aspect release an entire region of entry locations, within the LDQ 375 and/or STQ 380 in order for load or store instructions to be issued to the LSU 370.

Figure 5:
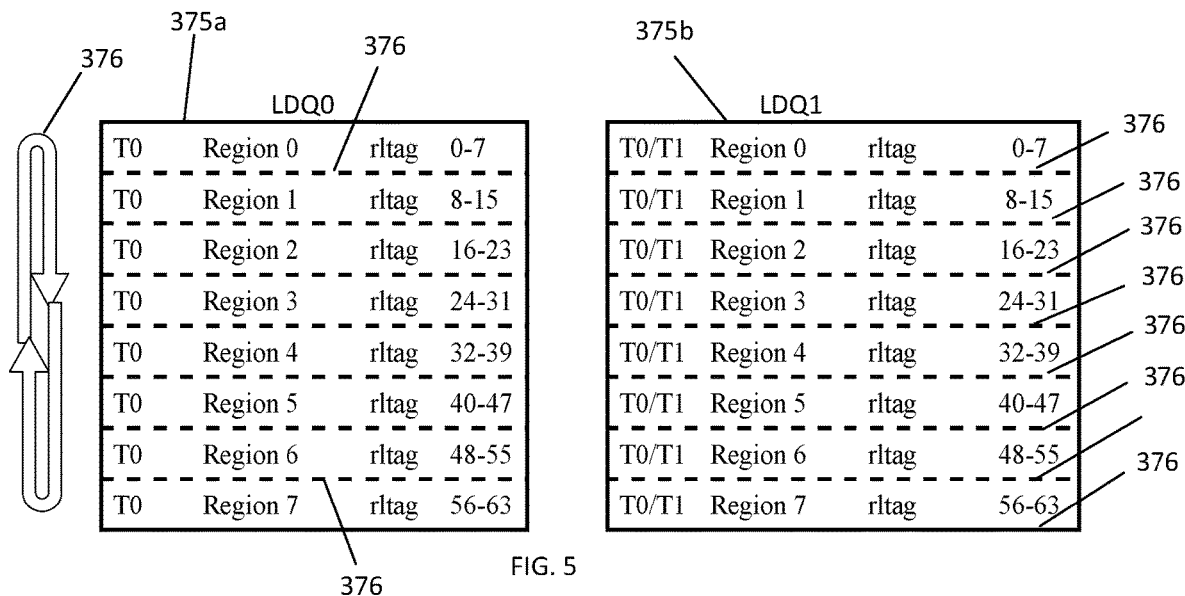
FIG. 5 illustrates a diagram of a load queue in accordance with an embodiment of the disclosure.
Figure 6:
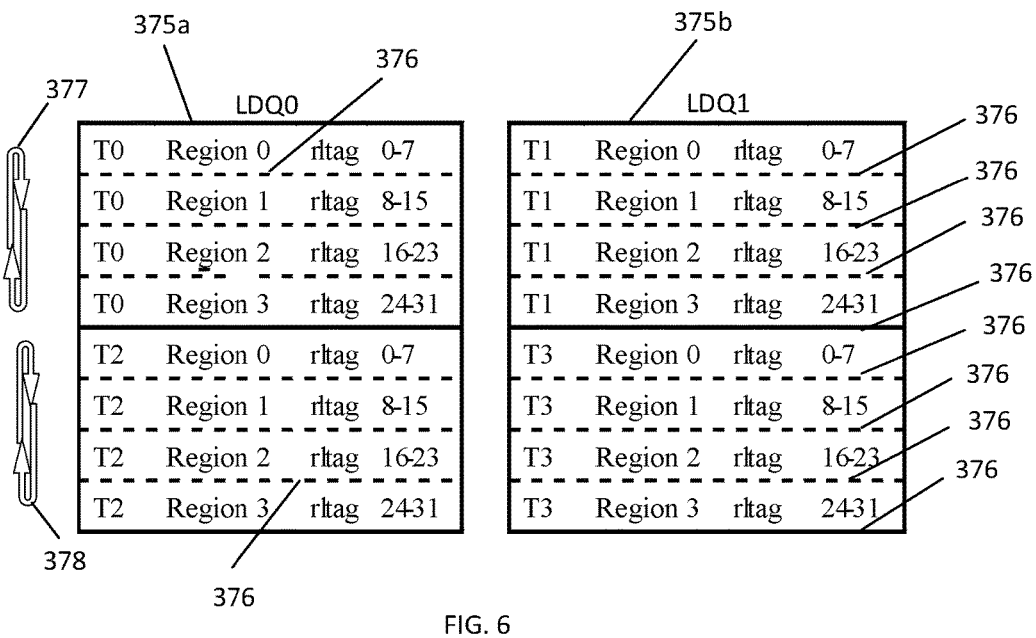
FIG. 6 illustrates a diagram of a load queue in accordance with an embodiment of the disclosure.

FIGS. 5-6 each show a diagram of an example of load queue (LDQ) 375 in accordance with a disclosed embodiment. As illustrated in FIGS. 5 and 6, the load queue LDQ 375 has two load queues 375*a* and 375*b*. There may be more or less load queues depending upon the design and configuration of the processor. Load queues (LDQ) 375*a* and 375*b* in FIGS. 5-6 each have been divided into eight (8) regions, where each region contains eight (8) load instructions, e.g., eight (8) rltags, and has a region boundary 376 between the regions (0-7) which is after the last instruction in each respective region. The instructions residing in the load queue LDQ 375 are referred to or identified by real load tags or rltags, which identifies the row (entry location) of the instruction in the load queue (LDQ). The load queues can be designed and configured with more or less regions of multiple entries or locations, e.g., rltags. The number of entries, e.g., rltags, per region may also vary to be more or less than eight. The load queue (LDQ) in the embodiments of FIGS. 5-6 each have a total of sixty four (64) entries, although more or less entries (rltags) may be configured for the load queue (LDQ). The load instructions are issued to the load queue (LDQ) and reside in the entry location, e.g., row, corresponding to the rltag stamped by the Dispatch Unit 320. The load queue 375*a* and 375*b* in FIG. 5 can be configured for single thread (ST) mode, or simultaneous multi-threading (SMT) mode, where in ST mode a single thread is processed and in SMT2 mode two threads are simultaneously processed.

Referring to FIG. 5, in single thread (ST) mode, a first thread (T0) of load instructions is issued by Issue Queue 330 to processor slice or pipeline LD0 or LD1, and the instructions are written to both load queues, LDQ0 and LDQ1. In ST mode, load queue LDQ1 (375*b*) is a copy of load queue LDQ0 (375*a*). In FIG. 5, LDQ may be used to simultaneously process two threads (SMT2) at once. In SMT2 mode, first thread (T0) load instructions are issued by issue queue 330 to LD0 or LD1 processor slice or pipeline, and the load instructions are written to load queue LDQ0 375*a*. Second thread (T1) load instructions are issued by Issue Queue 330 to LD0 or LD1 processor slice or pipeline, and the load instructions are written to load queue LDQ1 375*b*.

FIG. 6 shows a diagram of load queues for four threads of load instructions processed in simultaneous multi-thread (SMT4) mode. Load queues 375*a* and 375*b* in FIG. 6 each have been divided into two sections of four regions (Regions 0-3), where each region contains eight (8) load instructions, e.g., eight (8) rltags. Even thread T0 and T2 load instructions are issued to LD0 processor slice or pipeline, and the load instructions are written to load queue LDQ0 375*a*. Odd thread T1 and T3 load instructions are issued to LD1 processor slice or pipeline, and load instructions are written to load queue LDQ1 375*b*. In FIG. 6, for processing four threads simultaneously (SMT4 mode), the first thread (T0) is processed in the four regions (Region 0-3) of Section 0 of LDQ0, and the third thread (T2) is processed in the four regions (Region 0-3) of Section 2 of LDQ0 375*a*; while the second thread (T1) is processed in the four regions (Region 0-3) of Section 1 of LDQ1 375*b*, and the fourth thread (T3) is processed in the four regions (Regions 0-3) of Section 3 of LDQ1 375*b*. By use of virtual tagging, the Dispatch Unit in the embodiments of FIGS. 5-6 can dispatch 128 load instructions (ltags) per thread that include 64 real load tags (rltags) and 64 virtual load tags (vltags) as explained below.

Figure 7:
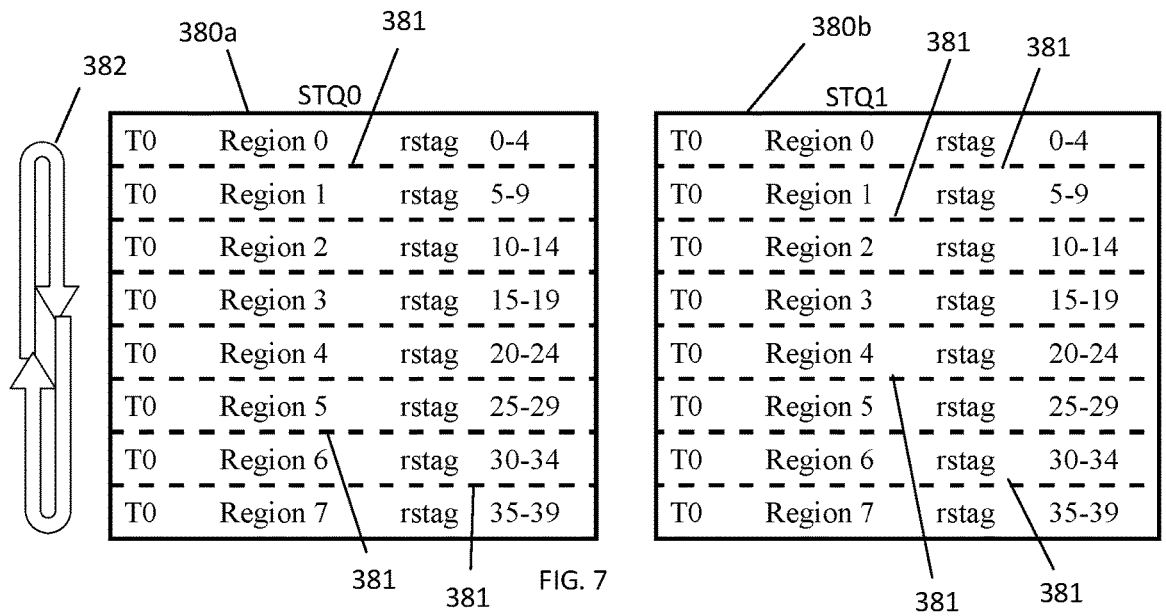
FIG. 7 illustrates a diagram of a store queue in accordance with an embodiment of the disclosure.
Figure 8:
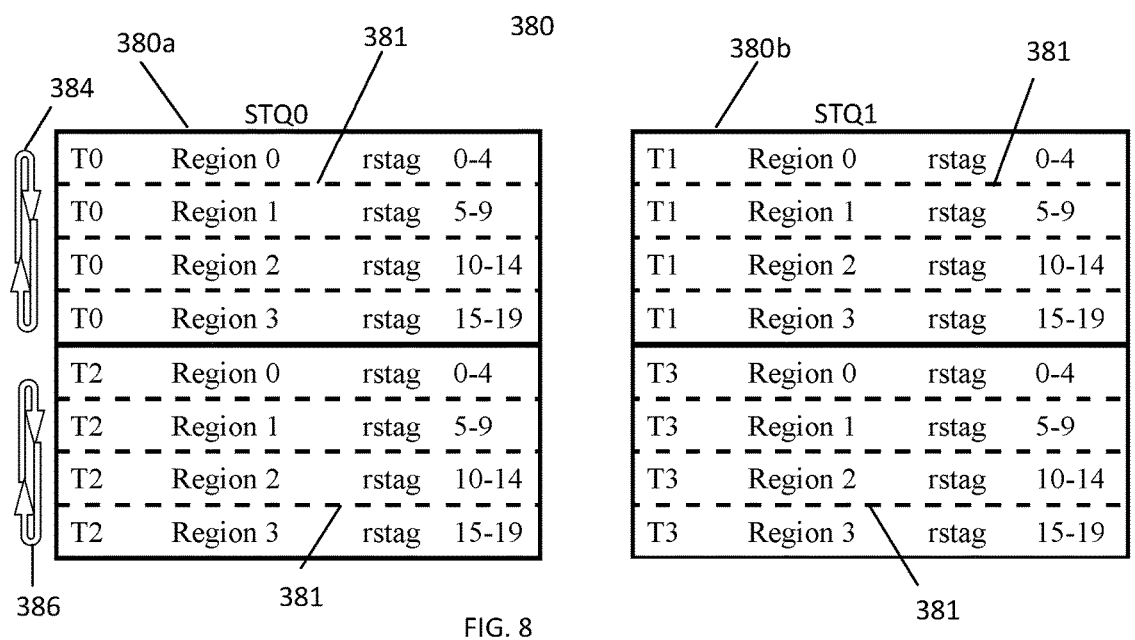
FIG. 8 illustrates a diagram of a store queue in accordance with an embodiment of the disclosure.

FIGS. 7-8 each show a diagram of an example of store queue (STQ) 380 in accordance with a disclosed embodiment. As illustrated in FIGS. 7-8, the store queue 380 has two store queues 380*a* and 380*b*. There may be more or less store queues depending upon the design and configuration of the processor. Store queues (STQ) 380*a* and 380*b* in FIGS. 7-8 each have been divided into eight (8) regions, where each region contains five (5) store instructions, e.g., five (5) rstags, and has a region boundary 381 between regions 0-7 or regions 0-4, which is after the last instruction in each respective region. The instructions residing in the store queue (STQ) are referred to as or identified by real store tags or rstags, which identifies the row (entry location) of the store instruction in the store queue (STQ). The store queues may be designed and configured to have more or less regions of multiple entries or locations. The number of entries, e.g., rstags, per region may be more or less than five. The store queue (STQ) in the embodiments of FIGS. 7-8 have a total of forty (40) entries, although more or less entries (stags) and regions may be configured for the store queue (STQ). The store instructions are issued to the store queue (STQ) and reside in the entry location, e.g., the row, corresponding to the rstag stamped by the Dispatch Unit 320. The store queues 380*a* and 380*b* in FIG. 7 can be configured for single-thread (ST) mode, or simultaneous multi-threading (SMT) mode, where in ST mode a single thread is processed and in SMT mode two threads (SMT2) are simultaneously processed.

In ST mode, shown in FIG. 7, first thread (T0) store instructions are issued to ST0 or ST1 processor pipeline, and store instructions are written to both store queues STQ0 and STQ1. That is in single thread mode (ST), store queue STQ1 380*b* is a copy of STQ0 380*a*. The store queues in FIG. 7 may also be used to process two threads simultaneously in SMT mode (SMT2). In SMT2 mode, first thread (T0) store instructions are issued by Issue Queue 330 to ST0 and ST1 processor slices or pipelines, and the store instructions are written to store queue STQ0 380*a*; and second thread (T1) store instructions are issued by Issue Queue to ST0 and ST1 processor slices or pipelines, and the store instructions are written to store queue STQ1 380*b*.

FIG. 8 shows a diagram of store queues for four threads of store instructions for simultaneous multi-thread processing (SMT4). As illustrated in FIG. 8, each store queue 380*a* and 380*b* has been divided into two sections of four regions (Region 0-3), where each Region contains five (5) store instructions, e.g., five (5) rstags. In SMT4 mode, even thread T0 and T2 store instructions are issued to ST0 processor slice or pipeline, and the store instructions are written to store queue STQ0 380*a*. Odd thread T1 and T3 store instructions are issued to ST1 processor slice or pipeline, and the store instructions are written to store queue STQ1 380*b*. In FIG. 8, for processing four threads simultaneously (SMT4 mode), the first thread (T0) is processed in the four regions (Region 0-3) of Section 0 in STQ0 380*a* and the third thread (T2) is processed in the four regions (Region 0-3) of Section 2 of STQ0 380*a*; while the second thread (T1) is processed in the four regions (Region 0-3) of Section 1 of STQ1 380*b* and the fourth thread (T3) is processed in the four regions (Region 0-3) of Section 3 of STQ1 380*b*. By use of virtual tagging, the Dispatch Unit in the embodiments of FIGS. 7-8 may dispatch 80 store instructions (stags) per thread that include 40 real store tags (rstags) and 40 virtual store tags (vstags) as explained below.

Figure 9:
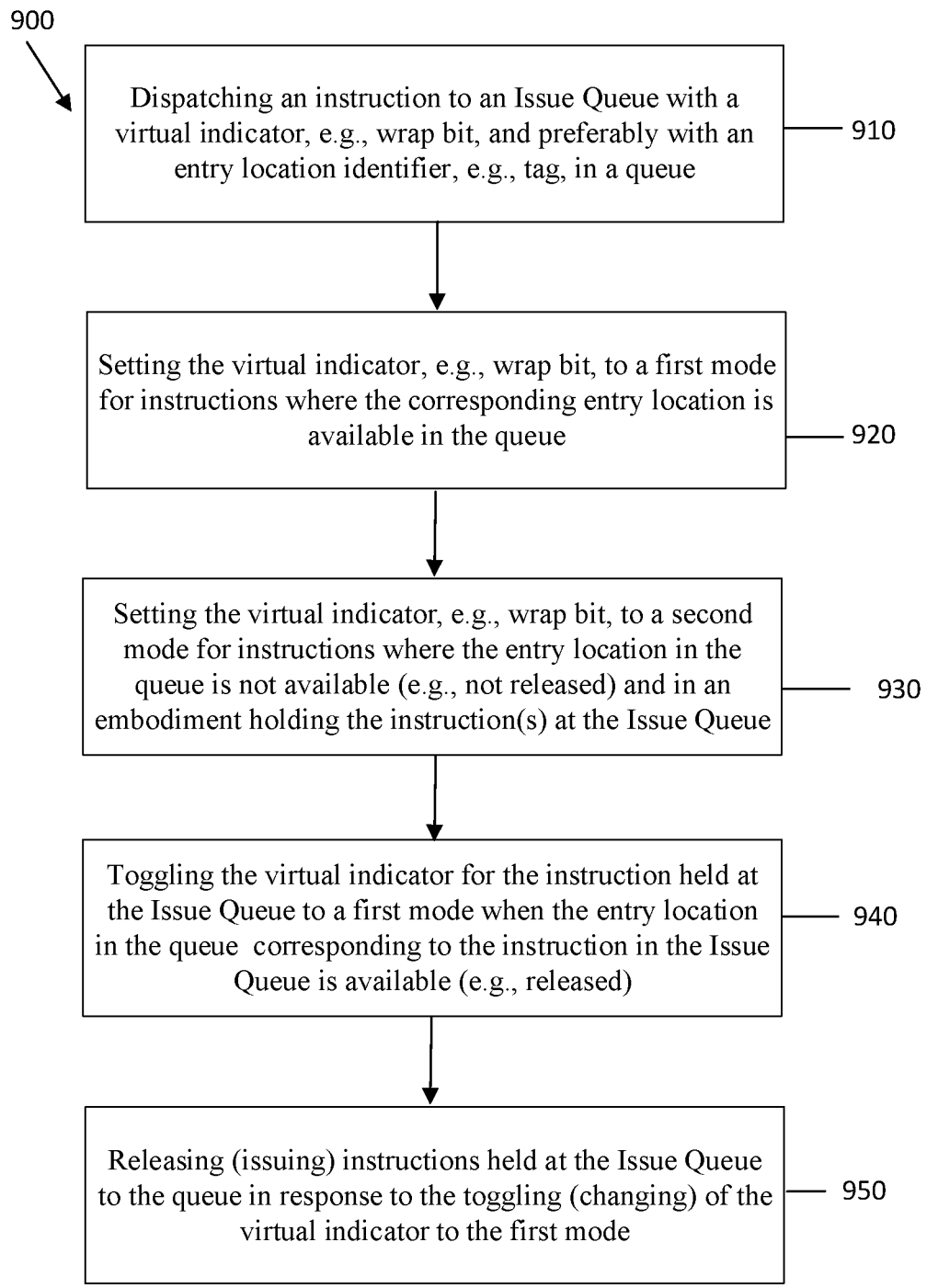
FIG. 9 is a flow diagram of an embodiment of a method of handling and processing information preferably in a processor.

FIG. 9 is an exemplary flowchart in accordance with one embodiment illustrating and describing a method of handling instructions in an information handling system, and more specifically a method of increasing the number of instructions, e.g., load and/or store instructions, dispatched by a processor, e.g., a dispatch unit in a processor, in accordance with an embodiment of the present disclosure. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

A method 900 of handling instructions in a processor is illustrated in FIG. 9, and more specifically a method of dispatching instructions in a processor to decrease latency by increasing the number of instructions dispatched to an Issue Queue that is preferably thereafter issued to a queue in an execution unit, such as, for example, an LSU execution unit. At 910 an instruction is dispatched, preferably by a Dispatch Unit, to an Issue Queue with a virtual indicator, e.g., a wrap bit. The instruction in an embodiment is also dispatched, preferably by the Dispatch Unit, with an entry location, e.g., rltag, for the queue in the execution unit. At 920, the virtual indicator, e.g., wrap bit, is set to a first mode for instructions where the entry location in the queue is available to receive the instruction from the Issue Queue, and the Issue Queue in an embodiment can immediately issue the instruction to the queue. At 930, the virtual indicator is set to a second mode, e.g., the wrap bit is toggled (set), for instructions dispatched to the Issue Queue where the entry location in the queue is not available, e.g., is not released, to receive the instruction from the Issue Queue. In an exemplary instance, an instruction already resides in the entry location, e.g., the row, where the new instruction is assigned to reside. At 940, the virtual indicator is reset to the first mode, e.g. the wrap bit is toggled (reset) to match the wrap bit of instructions residing in the queue, when the entry location in the queue corresponding to the instruction in the Issue Queue becomes available to receive the instruction, e.g., is released by the execution unit. At 950, releasing (issuing) instructions held at the Issue Queue to the queue in response to the Issue Queue changing (toggling) the virtual indicator from the second mode to the first mode.

In an embodiment, virtual tagging of load and store instructions is used in order to increase, e.g., double, the number of instructions that can be dispatched by the Dispatch Unit. Dispatch Unit 320 in an embodiment will stamp, e.g., assign, each dispatched load instruction to the Issue Queue 330 with an identifier, e.g., load tag (ltag), to identify the row (location, entry) in the load queue (LDQ) 375 where the instruction will be issued, e.g., reside. The load tags (ltags) in an aspect are allocated and dispatched by the Dispatch Unit 320 in ascending program order on a per thread basis. Referring back to FIG. 4, the Dispatch Unit 320 contains and maintains a per thread load instruction tag (ltag) counter 322 that increments for each load instruction in a thread that is dispatched to the Issue Queue (ISQ) 330, up until a maximum number of instructions for that thread have been placed into the load queue 375 in the LSU 370. If an entry is available in the load queue (LDQ) to receive an instruction, the Issue Queue (ISQ) will issue that instruction to the load queue (LDQ).

Once the maximum number of load instructions per thread is reached in the load queue LDQ, as explained in more detail below, then the load instruction is dispatched by the Dispatch Unit to the Issue Queue (ISQ) with an additional "virtual" indicator. Instructions issued with a virtual indicator are held at the Issue Queue and not issued to the load queue in the LSU until the corresponding region/entry in the load queue is released (deallocated). In this manner, by using virtual tagging, Instruction Dispatch Unit 320 can continue dispatching load instructions up until twice the number of entries available for load instructions in the load queue (LDQ) have been dispatched. Once twice the number of instructions (e.g., rltags) that can fit in the LDQ have been dispatched by the Instruction Dispatch Unit 320, then the Instruction Dispatch Unit 320 stalls at the next load instruction until the LDQ 375 has deallocated an entry (load instruction) or in an aspect a region of entries (load instructions), e.g., a single rltag or a region of rltags, in the LDQ.

More specifically, in an embodiment, if the location in the LDQ 375 where the instruction shall reside is not available to receive an instruction because it would rewrite or overwrite an entry (e.g., load instruction), and in an aspect rewrite or overwrite an entry that is part of a region, still in use by the LDQ 375, the least significant bits (lsbs) of the load instruction counter 322, are reset (e.g., set to zero), a virtual indicator, e.g., wrap bit (the most significant bit (msb)) of the load instruction counter 322), is toggled, and the Dispatch Unit 320 will continue to dispatch load instructions to the Issue Queue 330, indicating such instructions as virtual load instructions (vltags), i.e., the wrap bit is different for the virtual load instructions (vltags) than for the real load instructions (rltags). If the load instruction was dispatched to the Issue Queue 330 with a "virtual indicator", the Issue Queue 330 blocks issue of that load instruction to the LSU 370 until the matching entry, or in an aspect the matching region, in the load queue 375 is available, i.e., until the load instruction has, or in an aspect the load instructions in that region have, completed in their entirety as shown in the ICT 325.

Figure 12:
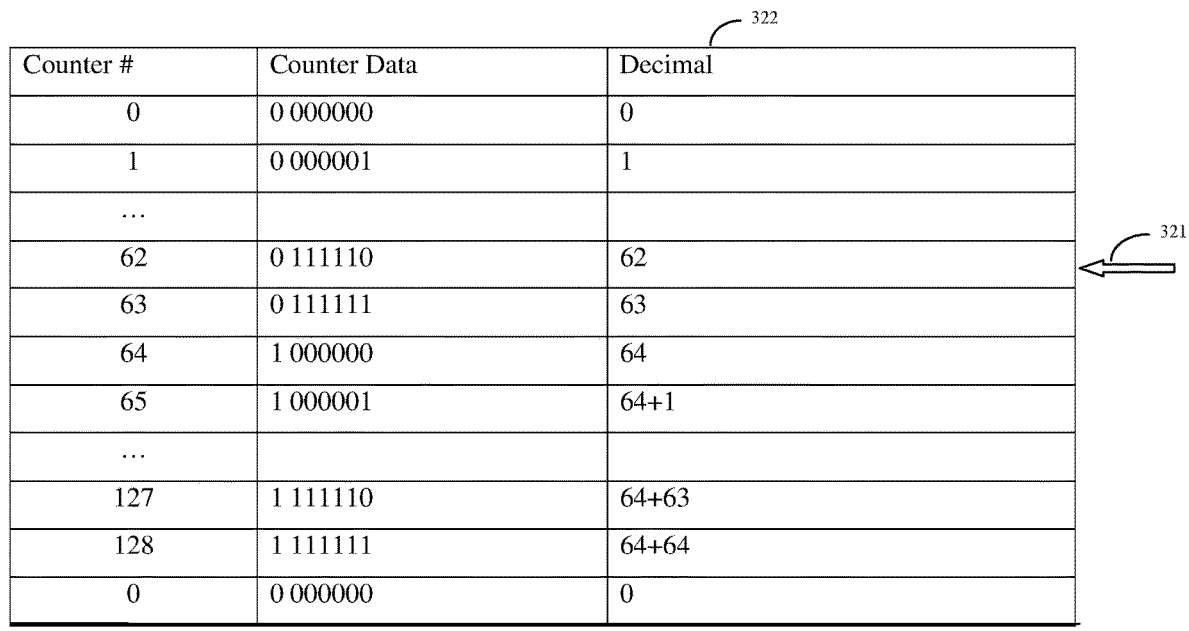
FIG. 12 depicts an example of a load counter in a Dispatch Unit according to an embodiment of the present disclosure.

Table 1 below and FIG. 12 is an example of a load counter 322 for load instructions dispatched by the Dispatch Unit 320 to the Issue Queue 330 that utilizes the virtual indicator, e.g., a wrap bit, to differentiate between real and virtual load instructions.

TABLE 1

| Counter # | Counter Data | Decimal |
| --- | --- | --- |
| 0 | 0 000000 | 0 |
| 1 | 0 000001 | 1 |
| . . . | | |
| 62 | 0 111110 | 62 |
| 63 | 0 111111 | 63 |
| 64 | 1 000000 | 64 |
| 65 | 1 000001 | 64 + 1 |
| . . . | | |
| 127 | 1 111110 | 64 + 63 |
| 128 | 1 111111 | 64 + 64 |
| 0 | 0 000000 | 0 |

In Table 1 and FIG. 12, the load counter # identifies the number of load instructions dispatched in a thread, the counter data indicates the fields of data in the load counter, and the last column in Table 1 (and FIG. 12) is the counter data translated into decimal. In the example in Table 1 (and FIG. 12), the load queue has sixty-four (64) entries. The load queue may have more or less entries. The maximum number of load instructions (rltags) per thread that can reside in the load queue LDQ depends upon on a number of design factors, including whether the processor is operating in single thread (ST) mode or simultaneous multiple thread mode (SMT).

As shown in Table 1 (and FIG. 12), the load instruction counter 322 starts at zero and counts to 63 (64 entries) by incrementing by one for each load instruction (ltag) that the Dispatch Unit 320 dispatches to the Issue Queue 330. If none of the load queue LDQ entries have released (deallocated), the load instruction counter 322 at the next load instruction after instruction #63 (i.e., instruction number 64) will reset the least significant bits (lsbs) to 0, and set or toggle the most significant bit (msb or wrap bit) to 1 as illustrated in Table 1. Note that because load queue has sixty four (64) entries, the counter continues to count as it normally would by incrementing by one after the sixty-fourth (64) entry. Where the number of entries in the load queue is greater or less than a power of 2 ($2^n$), then the toggle of the most significant bit (msb) will work as described in reference to the store counter 324 described below.

The toggling of the most significant bit (msb) or wrap bit at entry 64 indicates that load instruction #64 is a virtual instruction (vltag) in the example of Table 1 and the Issue Queue (ISQ) 330 will not issue the instruction to the load queue (LDQ) 370 until an entry location in the load queue (LDQ) has, or region of entries in the load queue (LDQ) 370 have, been released. If none of the load queue entries are released (deallocated), the counter 322 will continue to increment by one for each load instruction dispatched with the most significant bit (the virtual indicator or wrap bit) toggled (in the Table 1 example, set to 1). The load counter 322 will continue to increment by one until counter number 127 (representing 128 entries).

If the LSU has not released load queue entries (rltags) after counter No. 128, twice the number of load queue LDQ entries, the Dispatch Unit 320 in an embodiment is blocked from dispatching any further load instructions. If the LSU has released load queue entries (rltags), then the load counter 322 at the next dispatch of a load instruction resets to zero (the msb or wrap bit is toggled, and the lsbs are reset to zero), and the process repeats itself by incrementing the load counter 322 by one for each load instruction dispatched by the Dispatch Unit 320. If the dispatch load counter data has its most significant bit (msb) or wrap bit with a value that is opposite the value of the most significant bit (msb) that is currently in the load queue (LDQ) for that region, then the Dispatch Unit 320 will send the Issue Queue (ISQ) 330 the load instruction with the virtual indicator active (toggled to be different than the wrap bit of the instructions in the load queue) so that the Issue Queue 330 will wait for the entries or region of entries in the load queue (LDQ) to deallocate (release) before issuing load instructions to the LSU 370. In this manner, the Dispatch Unit 320 dispatches load instructions to the Issue Queue that are issued to and reside in the load queue (LDQ), which are identified by rltags, and dispatches load instructions to the Issue Queue that will be held at the Issue Queue 330 until a region of the load queue LDQ deallocates, which are identified by vltags. By use of virtual tagging, the Dispatch Unit 320 can dispatch twice the number of load instructions than can fit into the LDQ.

Dispatching store instructions in an embodiment also utilizes virtual tagging in a manner similar to the virtual tagging discussed for dispatching load instructions. Dispatch Unit 320 will stamp each store instruction dispatched to the Issue Queue 330 with an identifier, e.g., store tag (stags), to identify the row (location, entry) in the store queue (STQ) 380 where the store instruction will reside. The store instructions (stags) are allocated and stamped in ascending program order on a per thread basis by the Dispatch Unit 320. Referring back to FIG. 4, Dispatch Unit 320 also contains and maintains a per thread store instruction counter 324 that increments for each store instruction in a thread that is dispatched to the Issue Queue 330, up to a maximum number of instructions for that thread have been placed into the store queue 380 in the LSU 370. If an entry is available in the store queue (STQ) to receive an instruction, then the Issue Queue (USQ) will issue that instruction to the store queue (STQ).

Once the maximum number of store instructions is reached in the store queue STQ, as explained in more detail below, then the store instruction is dispatched by the Dispatch Unit 320 to the Issue Queue (ISQ) 330 with an additional "virtual" indicator. Instructions issued with a virtual indicator are held at the Issue Queue (ISQ) and are not issued to the store queue in the LSU until the corresponding region/entry in the store queue is released (deallocated). In this manner, by using virtual tagging, instruction Dispatch Unit 320 can continue dispatching store instructions up until twice the number of entries available for store instructions in the store queue (STQ) have been dispatched. Once twice the number of store instructions (e.g., rstags) that can fit into the STQ 380 have been dispatched by the Instruction Dispatch Unit, the Instruction Dispatch Unit 320 stalls at the next store instruction until the STQ 380 in an aspect has deallocated a region/entry of store instructions (e.g., a single entry or region of rstags) in the STQ.

More specifically, in an embodiment, if the location in the STQ where the instruction is to reside is not available to receive the instruction because it would rewrite or overwrite a store instruction entry (e.g., a rstag), and in an aspect rewrite or overwrite on entry that is part of a region, still in use by the STQ, the lsbs of the store instruction counter 324 is reset (e.g., set to zero), a virtual indicator, e.g., a wrap bit (the msb of the store instruction counter 324), is toggled, and the Dispatch Unit 320 will continue to dispatch store instructions to the Issue Queue 330, indicating such instructions as virtual store instructions (vstags), i.e., the wrap bit is different for the virtual store instructions (vstags) than for the real store instructions (rstags). If the store instruction was dispatched to the Issue Queue 330 with a "virtual" indicator, the Issue Queue 330 blocks issue of that store instruction to the LSU 370 until the matching entry, or in an aspect the matching region, in the store queue 380 is available, i.e., until the store instruction has, or in an aspect the store instructions in that region have, deallocated in their entirety as shown in the ICT 325.

Table 2 below is an example of store counter 324 for store instructions dispatched by Dispatch Unit 320 to the Issue Queue (ISQ) 330 using a virtual indicator, e.g., a wrap bit, to differentiate between real store instructions and virtual store instructions.

TABLE 2

| Counter # | Counter Data | Decimal |
| --- | --- | --- |
| 0 | 0 000000 | 0 |
| 1 | 0 000001 | 1 |
| ... | | |
| 38 | 0 100110 | 38 |
| 39 | 0 100111 | 39 |
| 40 | 1 000000 | 64 |
| 41 | 1 000001 | 64 + 1 |
| ... | | |
| 78 | 1 100110 | 64 + 38 |
| 79 | 1 100111 | 64 + 39 |
| 0 | 0 000000 | 0 |

In Table 2, the store counter # identifies the number of store instructions dispatched in a thread, the counter data indicates the fields of data in the counter, and the last column in Table 2 is the counter data translated into decimal. In the example in Table 2, the store queue STQ has forty (40) entries. The store queue may have more or less entries. The maximum number of store instructions (rstags) per thread that can reside in the store queue STQ depends upon a number of design factors, including whether the processor is operating in a single thread (ST) mode or a simultaneous multiple thread (SMT) mode.

As shown in Table 2, the store instruction counter 324 starts at zero and counts to 39 (40 entries) by incrementing by one for each store instruction (stag) that the Dispatch Unit 320 dispatches to the Issue Queue 330. If none of the store queue STQ entries have released (deallocated), the store instruction counter 324 at the next store instruction after #39 (i.e., counter #40) will reset the least significant bits (lsbs) to 0, and set or toggle the most significant bit (msb or wrap bit) to 1 as illustrated in Table 2. The toggling of the wrap bit (the most significant bit (msb)) indicates that the store instruction is a virtual store instruction (vstag) and the issue queue 330 will not issue the store instruction to the store queue STQ 380 until an entry location in the store queue or in an aspect a region of the store queue STQ entries, has been released. If none of the store queue entries are released (deallocated), the store counter 324 will continue to increment by one for each store instruction dispatched with the most significant bit (msb) or wrap bit toggled (in the Table 2 example, set to 1). The store counter 324 will continue to increment by one until counter #79 (representing 80 entries).

If the LSU has not released any store queue entries after counter #79, twice the number of store queue STQ entries, the Dispatch Unit 330 in an embodiment is blocked from dispatching any further store instructions. If the LSU has released store queue entries (rstags), then the store counter 324 at the next dispatch of a store instruction resets to zero (the msb or wrap bit is toggled and the lsbs are set to zero) and the process repeats itself by incrementing the store counter 324 by one for each store instruction dispatched by the Dispatch Unit 320. If the dispatch store counter data has its most significant bit (msb) or wrap bit with a value that is opposite the value of the most significant bit (msb) or wrap bit that is currently in the store queue for that region, then the Dispatch Unit 320 will send the Issue Queue (ISQ) 330 the store instruction with the virtual indicator active (toggled) to be different than the wrap bit of the instructions in the store queue) so that the Issue Queue 330 will wait for the entries or the region entries in the store queue (STQ) to deallocate before issuing store instructions to the LSU 370. In this manner, the Dispatch Unit 320 dispatches store instructions to the Issue Queue that are issued to and reside in the store queue (STQ), which are identified (designated) by rstags, and dispatches store instructions to the Issue Queue 330 that will be held at the Issue Queue 330 until an entry or a region of entries in the store queue (STQ) deallocates, which are identified (designated) by vstags. By use of virtual tagging, the Dispatch Unit 320 can dispatch twice the number of store instructions than can fit into the store queue STQ.

Disclosed is a technique, method, system, processor, and load and store queues for allocating (assigning) and releasing (deallocating) entries in a load queue and/or store queue, preferably a LSU load queue and/or store queue. In an aspect, assignment of LDQ entries and/or STQ entries is based upon circular thread based allocation. In an embodiment, the load and/or store instructions are assigned and released on a regional basis. Such circular thread based assignment and/or region based assignment and/or release of load and/or store instructions from their respective queues optimizes fast reuse of load queue and/or store queue entries with reduced tracking requirements, e.g., reduced tracking hardware requirements. The techniques and methods disclosed for assigning and releasing entries in load and/or store queues will have application to other queues, processors, and systems.

Figure 10:
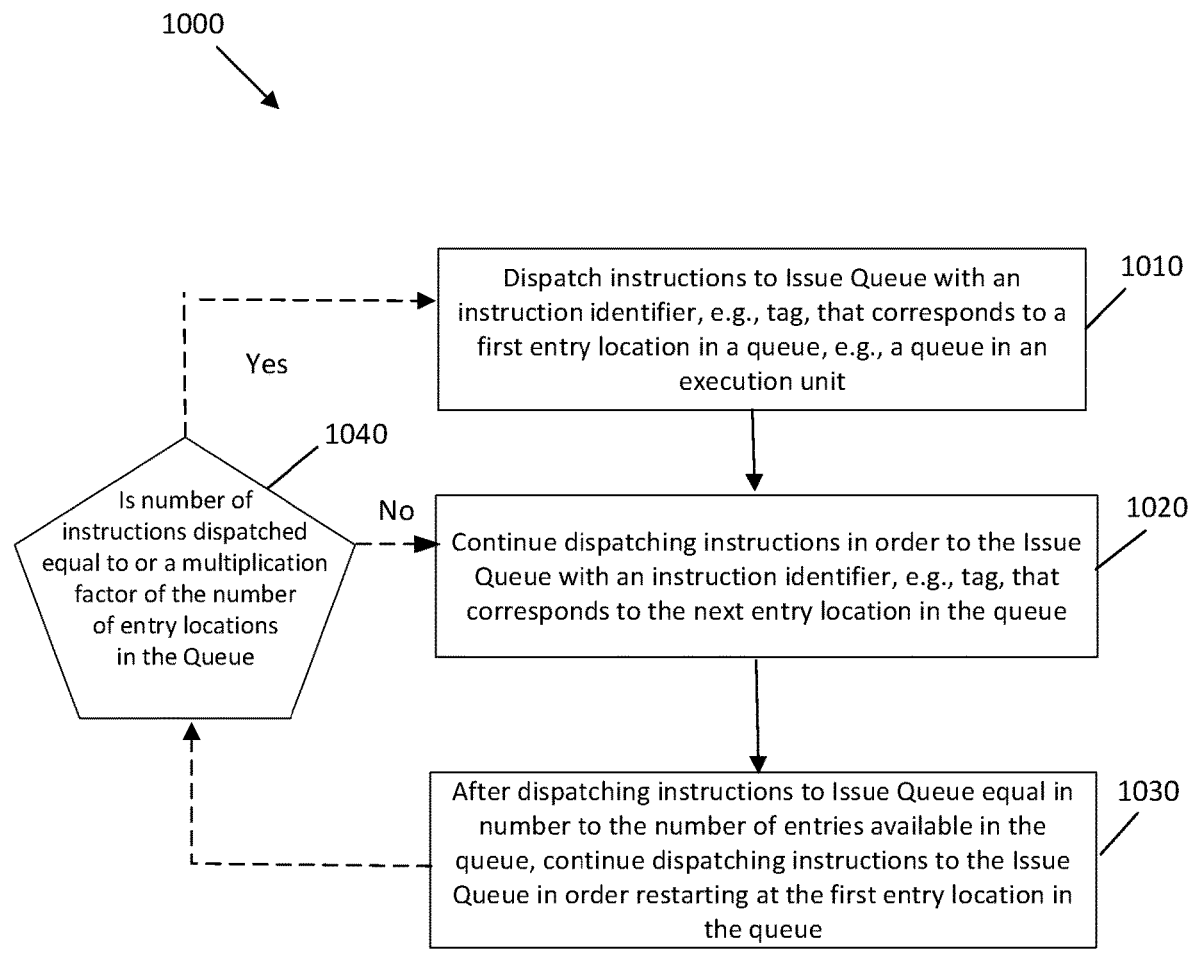
FIG. 10 is a flow diagram of an embodiment of a method of handling and processing information preferably in a processor.

FIG. 10 is an exemplary flowchart in accordance with one embodiment illustrating and describing a method of handling instructions in an information handling system, and more specifically a method of assigning entry locations, e.g., tags, in a queue, for example, in an execution unit such as, for example, an LSU, in accordance with an embodiment of the present disclosure. While the method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, simultaneously, or the steps may be performed in the order disclosed or in an alternate order.

A method 1000 of assigning entries to a queue in, for example, an execution unit is disclosed in FIG. 10, and more specifically a method for dispatching instructions, preferably to an Issue Queue in a processor, that identifies the entry location in a queue to which the instruction will issue. At 1010, instructions are dispatched to an Issue Queue, preferably from a Dispatch Unit, with an instruction identifier, e.g., tag, that corresponds to a first entry location in a queue, preferably in an embodiment a queue in an execution unit such as, for example, an LSU execution unit. The instructions in an embodiment may be store or load instructions for a queue in an LSU. Additional instructions are dispatched at 1020 to the Issue Queue in program order within a particular thread with an instruction identifier, e.g., tag, that corresponds to the next entry location in the queue in the execution unit. For example, if the first instruction identifier is tag0, then the following instruction identifier is tag1, followed by tag2, etc., until all the entry locations in the queue have been allocated.

After dispatching instructions to the Issue Queue that corresponds to the number of available entries in the execution unit, at 1030 additional instructions will be dispatched to the Issue Queue in order restarting at the original or first entry location of the queue. At 1040 it is determined if the number of instructions dispatched is equal to, or is a multiplication factor times larger than, the number of entry locations in the queue. For example, if the queue holds x entries, process 1040 determines whether the number of instructions are equal to x, 2x, 3x, etc. Process 1040 may be performed for example by a comparison. If the number of instructions dispatched is equal to, or is an even multiplication factor times larger than, the number of entry locations in the queue [1040:YES], then the process goes to 1010, if no [1040:NO], then the process goes to 1020. This method of assigning or allocating instructions to the queue is referred to as a circular thread based allocation mode.

In FIG. 5, for both single thread mode or simultaneous multi-threading mode for two threads (SMT2), the load queue (LDQ) entries in an embodiment are assigned based upon a circular thread based assignment mode illustrated by circular arrows 376 where after all entries, e.g., including all eight (8) regions (Region 0-7), are assigned in order for a particular thread, the Dispatch Unit loops back and assigns the next instruction in that particular thread to be dispatched to the first entry, e.g., the first region (Region 0), in the respective load queue (LDQ). Note that while only one group of circular arrows 376 is illustrated in FIG. 5 (corresponding to LDQ0 (375*a*)), both load queues 375*a* and 375*b* preferably would operate in circular thread based mode as illustrated by circular arrows 376.

In FIG. 6, for simultaneous multi-threading of four threads (SMT4), the load queue (LDQ) entries in an embodiment are assigned based upon a circular thread based assignment mode as illustrated by circular arrows 377 and 378 where after all entries, e.g., including all four (4) respective regions (Regions 0-4), are assigned in order for a particular thread, the Dispatch Unit loops back and assigns the next instruction in that thread to be dispatched to the first entry, e.g., the first region (Region 0), in the respective load queue (LDQ) for each respective thread. Note that while only one group of circular arrows 377 and 378 are illustrated in FIG. 6 (corresponding to LDQ0 (375*a*)), both load queues 375*a* and 375*b* preferably would operate in circular thread based mode as illustrated by circular arrows 377 and 378.

In FIG. 7, for both single thread (ST) mode and dual thread simultaneous threading (SMT2) mode, the STQ entries (stags) are assigned based upon a circular thread based assignment as shown by circular arrows 382 where after all entries, e.g. including all eight (8) regions (Regions 0-7) of five (5) entries, are assigned in order for a particular thread, the Dispatch Unit loops back and assigns the next instruction in that thread to be dispatched to the first entry, e.g., the first region (Region 0), in the respective store queue. Note that while only one group of circular arrows 382 is illustrated in FIG. 7 (corresponding to STQ0 (380*a*)), both store queues 380*a* and 380*b* preferably would operate in circular thread based mode as illustrated by circular arrows 382.

In FIG. 8, the STQ entries (stags) are assigned based upon a circular thread based assignment where after all entries, e.g, including all four regions (Region 0-3) of five entries, are assigned in order for a particular thread, the Dispatch Unit loops back and assigns the next instruction in that thread to be dispatched to the first entry, e.g., the first region (Region 0), in the respective store queue. Note that while only one group of circular arrows 384 and 386 are illustrated in FIG. 8 (corresponding to STQ0 (380*a*)), both store queues 380*a* and 380*b* preferably would operate in circular thread based mode as illustrated by circular arrows 384 and 386.

The instruction Dispatch Unit 320 in an embodiment does region by region tracking and/or deallocating of the load queue (LDQ) 375. In an embodiment, the Issue Queue (ISQ) will only issue a store instruction or load instruction to the LSU if the region is available (released, deallocated) in the LSU's respective store queue (STQ) or load queue (LDQ) that matches the region assigned to the instruction residing in the Issue Queue (ISQ).

Figure 11:
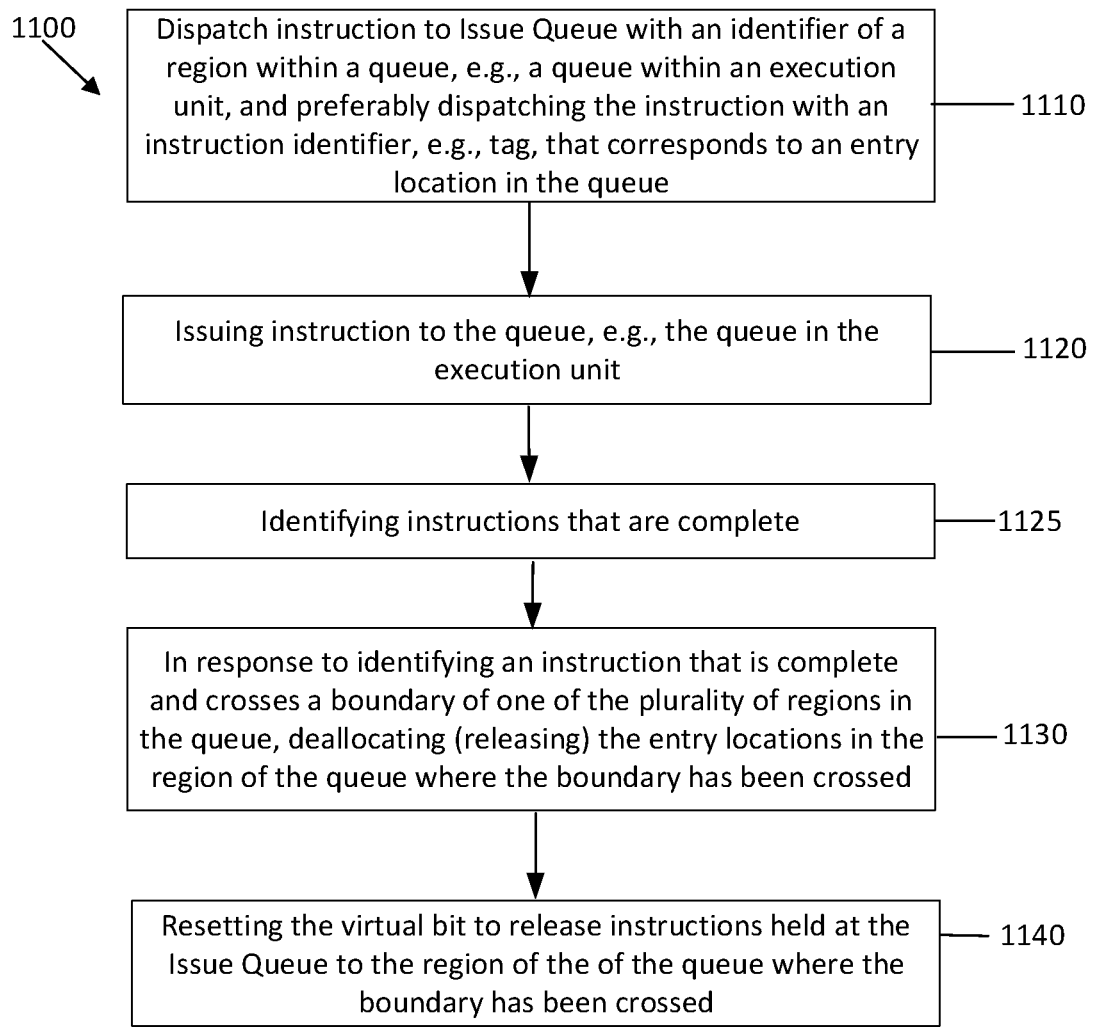
FIG. 11 is a flow diagram of an embodiment of a method of handling and processing information preferably in a processor.

FIG. 11 is an exemplary flowchart in accordance with one embodiment illustrating and describing a method of handling instructions in an information handling system, and more specifically a method of partitioning a queue in a processor into regions, and deallocating queue location entries on a region basis, in accordance with an embodiment of the present disclosure. While the method 1100 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 11, but the process may be integrated and/or one or more steps may be performed together, simultaneously, or the steps may be performed in the order disclosed or in an alternate order.

A method 1100 of handling instructions in a processor is illustrated in FIG. 11, and more specifically a method of partitioning a queue into regions and deallocating, e.g., releasing, instructions in a queue on a region by region basis, e.g., group basis rather than on an entry by entry basis. At 1110, instructions are dispatched to an Issue Queue, preferably from a Dispatch Unit, with an identifier of a region (region identifier) within a queue, e.g., a field of bits identifying a region of the queue. The queue may be a queue of an execution unit, such as, for example, a load or store queue in a load store unit (LSU). Other queues are contemplated as being applicable to the disclosed process, and techniques. The instructions in an embodiment are dispatched to the Issue Queue with an instruction location identifier, e.g., a tag, that corresponds to an entry location in the queue. At 1120, the instructions are issued to the queue, preferably the instructions are issued to the queue by the Issue Queue. At 1122, the instructions that are complete are identified, and at 1130 in response to identifying an instruction that is complete and crosses a boundary of one of the plurality of regions in the queue, the instructions in the entry locations in the region of the queue where the boundary has been crossed are released, deallocated, or made available for the next instruction on a region basis. For example, an instruction entry location in the queue is not released to receive another instruction until all the instructions within the same region, e.g., partition, of the queue are completed, and then all the instructions in that same region are released (deallocated). At 1140, resetting the virtual bit to release instructions held at the Issue Queue to the region of the of the queue where the boundary has been crossed.

An example of a region by region deallocation process for a load and store queue in an LSU is disclosed. As indicated earlier, the Dispatch Unit 320 will dispatch load instructions to the Issue Queue (ISQ) 330 with a load tag (hag), e.g. a virtual load tag (vltag) if the wrap bit is set (toggled) or a real load tag (rltag). The Dispatch Unit 320 will also dispatch load instructions to the Issue Queue (ISQ) 330 with a three bit region field (e.g., region identifier). The three bit region field identifies the region in the load queue where the load instructions, i.e., the load queue entry, is located. The Issue Queue 330 issues load instructions to the LSU 370 with the load tag, e.g., rltag, and in an aspect, the three bit region field designating the region of the load queue is not issued to the LSU 370.

FIG. 5 illustrates an example of two load queues, LDQ0 and LDQ1, partitioned into eight regions, e.g., Region 0-Region 7. Region 0 of each load queue (LDQ) contains eight load instructions, i.e., rltags 0-7, and is indicated by a three bit field "000"; Region 1 contains eight load instructions, i.e., rltags 8-15 and is indicated by a three bit field "001"; Region 2 of each load queue contains eight load instructions, i.e., rltags 16-23 and is indicated by a three bit field "010"; etc. The full table of three bit fields for the eight (8) regions of the load queues in FIG. 5 are shown in Table 3.

TABLE 3

| Region # | ltags | Field bits |
|---|---|---|
| 0 | 0-7 | 000 |
| 1 | 8-15 | 001 |

TABLE 3-continued

| Region # | ltags | Field bits |
|---|---|---|
| 2 | 16-23 | 010 |
| 3 | 24-31 | 011 |
| 4 | 32-39 | 100 |
| 5 | 40-47 | 101 |
| 6 | 48-55 | 110 |
| 7 | 56-63 | 111 |

FIG. 6 illustrates an example of two load queues, LDQ0 and LDQ1, partitioned into two sections of four (4) regions, e.g., Region 0-Region 3. Table 4 below shows the three bit fields for the load queues LDQ0 and LDQ1 of FIG. 6.

TABLE 4

| Section # | Region # | Ltags | Field |
|---|---|---|---|
| 0 | 0 | 0-7 | 000 |
| 0 | 1 | 8-15 | 001 |
| 0 | 2 | 16-23 | 010 |
| 0 | 3 | 24-31 | 011 |
| 1 | 0 | 32-39 | 100 |
| 1 | 1 | 40-47 | 101 |
| 1 | 2 | 48-55 | 110 |
| 1 | 3 | 56-63 | 111 |

In an embodiment, the instruction Dispatch Unit performs region by region tracking and/or deallocation of the load queue (LDQ) entries. The LSU 370 executes load instructions out of order and when LSU 370 finishes a load instruction, the LSU 370 will send the finished load instruction, e.g., ltag, to the ICT 325. The ICT 325 completes the load instructions in order. Each entry in the ICT 325 has a one bit field to indicate that an instruction is a load instruction or a store instruction. In an embodiment, when the ICT 325 completes one or more instructions in a cycle, the ICT 325 will indicate to the Dispatch Unit 320 the number of loads completed in the cycle by counting the number of ICT entries that have completed and have the load bit. The Dispatch Unit logic as shown in FIG. 12 keeps a pointer 321 to the oldest load instruction, e.g., oldest ltag, that has been completed (deallocated). The Dispatch Unit 320 increments its oldest ltag complete pointer 321 by the number of load instructions that were completed, as informed by the ICT 325. If the oldest ltag pointer 321 tracking loads that are complete crosses a region boundary in the load queue and moves into the next region, then the Dispatch Unit 320 knows the old region is considered deallocated, and the Dispatch Unit can reallocate load instructions to that region.

Dispatch Unit 320 informs the Issue Queue 330 the region that is deallocated so the Issue Queue can reset the virtual bit of the instructions held at the Issue Queue, so those instructions held at the Issue Queue are released to the LDQ 375. In other words, The Dispatch Unit will translate the number of loads completed into tx_load_region_deallocate(0:7) based upon the current ltag tail pointer in the Dispatch Unit. The tx_load_region_deallocate can then be used by the Issue Queue to clear the region dependency stall of any relevant "virtual" dispatches in the Issue Queue. The Issue Queue 330 in an embodiment will only issue a load instruction to the LSU if the region in the LSU that matches the region of the instruction in the Issue Queue is available, e.g., has been released (deallocated). Care should be taken in circumstances where a "virtual" dispatch occurs and the required region deallocate from the load queue (LDQ) occurs in close timing proximity to each other.

The Dispatch Unit may also do region by region tracking for available regions based largely upon the wrap bit of the load queue counter 322 and/or the store queue counter 324. In the case of the load queue, the load queue deallocates regions in order, so the Dispatch Unit 320 is aware of what region the load queue is processing (because the region deallocate (0:7) signal is sent to the Dispatch Unit in ascending order each time a group of eight (8) loads is deallocated) and will deallocate the next region.

The Dispatch Unit can keep a count of the number of regions difference (region_delta) between what region the Dispatch Unit is allocating and what region the load queue is working on deallocating. Using the wrap bit (or virtual indicator) there are sixteen (16) regions total with up to eight (8) physical regions in the load queue. If the region difference count is between 0 and 7, then the Dispatch Unit will allocate loads into the current "non-virtual" region. For example, the Dispatch Unit will send the Issue Queue, virtual (wrap bit)=0, region=x, and rltag=y. If the region difference count is between 8 and 15, the Dispatch Unit will allocate loads into its current "virtual" region, e.g., the Dispatch Unit will send the Issue Queue virtual (wrap bit)=1, region=x, and rltag=y. If the region difference count is 16, then the Dispatch Unit will stop allocating loads until in an embodiment a region deallocate is sent from the load queue (LDQ). The Issue Queue in this embodiment must wait for a region x deallocation from the load queue (LDQ) which will clear the virtual indicator, e.g., the wrap bit, in all the Issue Queue entries marked with region x and allow the load to be issued to the load queue in the LSU.

The instruction Dispatch Unit 320 in an embodiment will perform region by region tracking and/or deallocation of the store queue (STQ) 380 entries. As indicated earlier, the Dispatch Unit 320 will dispatch store instructions to the Issue Queue (ISQ) 330 with a store tag (stag), e.g. a virtual store tag (vstag) if the wrap bit is set (toggled) or a real store tag (rstag). The Dispatch Unit 320 will also dispatch store instructions to the ISQ 330 with a three bit region field. The three bit region field identifies the region in the store queue where the store queue entry is located. The Issue Queue 330 issues store instructions to the LSU 370 with the store tag, e.g., rstag, and in an aspect, the three bit region field designating the region of the store queue is not issued to the LSU.

FIG. 7 illustrates an example of two store queues, STQ0 and STQ1, partitioned into eight (8) regions, e.g., Region 0-Region 7. Region 0 of each store queue (STQ) contains five (5) store instructions, i.e., rstags 0-4, and is indicated by a three bit field "000"; Region 1 of each store queue (STQ) contains five (5) store instructions, i.e., rstags 5-9, and is indicated by a three bit field "001"; Region 2 of each store queue (STQ) contains five (5) store instructions, i.e., rstags 10-14, and is indicated by a three bit field "010"; etc. The full table of three bit fields for the eight regions of the store queues (STQ) are shown in Table 5.

TABLE 5

| Region # | Rstags | Field bits |
|---|---|---|
| 0 | 0-4 | 000 |
| 1 | 5-9 | 001 |
| 2 | 10-14 | 010 |
| 3 | 15-19 | 011 |
| 4 | 20-24 | 100 |
| 5 | 25-29 | 101 |

TABLE 5-continued

| Region # | Rstags | Field bits |
|---|---|---|
| 6 | 30-34 | 110 |
| 7 | 35-39 | 111 |

FIG. 8 illustrates an example of two store queues, STQ0 and STQ1, partitioned into two sections of four (4) regions, e.g., Region 0-Region 3. Table 6 below shows the three bit region fields for the store queues STQ0 and STQ1 of FIG. 8.

TABLE 6

| Section # | Region # | Stags | Field Units |
|---|---|---|---|
| 0 | 0 | 0-4 | 000 |
| 0 | 1 | 5-9 | 001 |
| 0 | 2 | 10-14 | 010 |
| 0 | 3 | 15-19 | 011 |
| 1 | 0 | 0-4 | 100 |
| 1 | 1 | 5-9 | 101 |
| 1 | 2 | 10-14 | 110 |
| 1 | 3 | 15-19 | 111 |

In an embodiment, the processor performs region by region deallocation of instructions in a store queue, e.g., STQ 380. The LSU 370 executes store instructions out of order and when the LSU 370 finishes a store instruction, the LSU 370 will send the finished store instruction, e.g., stag, to the ICT 325. The ICT 325 completes the stores in order and informs the STQ 380 when the store instruction is complete. The STQ 380 receives the signal that the store instruction is complete, and then, in an embodiment, drains the store instruction to L1 and/or L2 cache. Store instructions will drain out of STQ 380 in order once completed. When the store instruction drains to L1 and/or L2 cache, the store instruction deallocates. The STQ 380 detects when a store instruction that deallocates crosses a region boundary, and STQ 380 informs the Dispatch Unit that a region boundary has been crossed. When the store drain crosses a region boundary as defined by the STQ region allocation scheme, the STQ will drive ls_sd_tx_region_dealloc(i) where x is the thread and i is the region number that is deallocated.

Dispatch Unit 320 informs the Issue Queue 330 the region that is deallocated so the Issue Queue can reset the virtual bit of the instructions held at the Issue Queue, so those instructions held at the Issue Queue are released to the store queue, e.g., STQ 380. Care should be taken in circumstances where a "virtual" dispatch occurs and the required region deallocate from the store queue (STQ) occurs in close timing proximity to each other.

In the case of region by region tracking of the store queue, the store queue deallocates regions in order, so the Dispatch Unit 320 is aware of what region the store queue is processing (because the region deallocate (0:7) signal is sent to the Dispatch Unit in ascending order each time a group, for example a group of five (5) in the case of SDQ 380, of stores is deallocated) and will deallocate the next region. The Dispatch Unit keeps a count of the number of regions difference (region_delta) between what region the Dispatch Unit is allocating and what region the store queue is working on deallocating. Using the wrap bit (or virtual indicator) there are sixteen (16) regions total with up to eight (8) physical regions in the store queue. If the region difference count is between 0 and 7, then the Dispatch Unit will allocate stores into the current "non-virtual" region. For example, the Dispatch Unit will send the Issue Queue, virtual (wrap bit)=0, region=x, and rstag=y. If the region difference count is between 8 and 15, the Dispatch Unit will allocate stores into its current "virtual" region, e.g., the Dispatch Unit will send the Issue Queue virtual (wrap bit)=1, region=x, and rstag=y. If the region difference count is 16, then the Dispatch Unit will stop allocating stores until in an embodiment a region deallocate is sent from the store queue (STQ). The Issue Queue in this embodiment must wait for a region x deallocation from the store queue (STQ) which will clear the virtual indicator, e.g., the wrap bit, in all the Issue Queue entries marked with region x and allow the store to be issued to the store queue in the LSU.

There are circumstances when the instructions in the load and store queues in the execution unit, for example, the LSU will need to be flushed. As mentioned, each entry in the ICT 325 will contain one store bit and one load bit. When a range of ICT entries are being flushed, in an embodiment, the number of load bits and/or the number of store bits shall be counted and reported back to the Dispatch Unit 320. The Dispatch Unit will then subtract the number of flushed entries from the current stag or ltag count to determine what stag count or ltag count to resume the Dispatch Unit 320 with after the flush. At flush time, ICT 325 will count the number of flushed stag/ltag and recalculate the location of the head pointers in the Issue Queue 330. Special care should be used to not double count flushed loads and/or stores, for example, in situations where multiple flushes occur within close proximity of one another. In an embodiment, techniques, methods, programming, configuration and systems should be provided to avoid the situation where an instruction thread (stream ID) is flushed that does not flush out all the younger stores or loads in the ICT. A special case may occur when the store queue STQ jumps over multiple rstags all corresponding to an instruction thread that has been flushed. In this case, many rstags might drain and deallocate simultaneously, and thus, multiple region deallocates can occur simultaneously on the same cycle.

While the illustrative embodiments described above are preferably implemented in hardware, such as in units and circuitry of a processor, various aspects of the illustrative embodiments may be implemented in software as well. For example, it will be understood that each block of the flowchart illustration in FIGS. 9-11, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
dispatching an instruction to an Issue Queue with a virtual indicator indicating a virtual instruction and a region indicator that identifies a region of a queue in an execution unit to which the instruction is to be issued, wherein the region comprises a plurality of entry locations within the queue;
setting the virtual indicator to a first mode for instructions where an entry location in the queue is available to receive an instruction;
setting the virtual indicator to a second mode where the entry location in the queue is not available to receive the instruction;
changing the virtual indicator from a second mode to a first mode when the entry location in the queue is deallocated and available to receive the instruction; and
releasing entry locations by regions wherein all entry locations in a region are deallocated together.

2. The method according to claim 1, wherein the instruction is dispatched from a Dispatch Unit to the Issue Queue with the virtual indicator and the virtual indicator is a wrap bit.

3. The method according to claim 1, further comprising dispatching the instruction to the Issue Queue stamped with an entry location identifier that identifies the entry location in the queue to which the instruction is to be issued.

4. The method according to claim 1, wherein the execution unit is a load store unit and the queue is at least one of the group consisting of a load queue, a store queue, and combinations thereof.

5. The method according to claim 4, wherein the store queue does not deallocate until a store instruction has drained out of the store queue and to at least one of the L1 or L2 Cache.

6. The method according to claim 1, further comprising holding instructions in the Issue Queue when the virtual indicator is in a second mode and releasing instructions held at the Issue Queue to the queue in response to the Issue Queue changing the virtual indicator from the second mode to the first mode.

7. The method according to claim 1, wherein the method further comprises informing the Issue Queue, by the Dispatch Unit, when a region is deallocated and toggling the virtual indicator of the instructions held at the Issue Queue.

8. The method according to claim 1, further comprising identifying instructions that are complete, and wherein in response to identifying an instruction that is complete that crosses a boundary of one of the plurality of regions in the queue, deallocating the entry locations in the region of the queue where the boundary has been crossed to receive new instructions, and resetting the virtual bit to release instructions held at the Issue Queue to the region of the queue where the boundary has been crossed.

9. The method according to claim 3, further comprising dispatching instructions with entry location identifiers in program order per thread wherein a first dispatched instruction is stamped with a first entry location, and in response to dispatching enough instructions to fill all the entry locations in the queue, setting the virtual indicator to the second mode and dispatching the next instruction to be dispatched with the first entry location.

10. A computer system for processing information, the computer system comprising: at least one computer processor comprising:
a Dispatch Unit for dispatching instructions;
an Issue Queue for receiving instructions dispatched from the Dispatch Unit; and
a queue in an execution unit for receiving instructions issued from the Issue Queue, the queue having a plurality of entry locations for storing data, wherein the Dispatch Unit is configured to dispatch instructions to the Issue Queue with a virtual indicator, and the virtual indicator is set to a first mode for instructions dispatched where an entry location is available in the queue to receive the dispatched instruction, and the virtual indicator is set to a second mode for instructions dispatched where an entry location is not available in the queue to receive the dispatched instruction, and wherein the Dispatch Unit is configured to dispatch instructions to the Issue Queue with a region identifier that identifies a region of the queue to which the instruction is to be issued, wherein the region comprises a plurality of entry locations within the queue.

11. The computer system of claim 10, wherein the Issue Queue is configured to (a) issue instructions to the queue when the virtual indicator is set to a first mode and to hold instructions when the virtual indicator is set to a second mode, (b) change the virtual indicator from a second mode to a first mode in response to the entry location in the queue being deallocated and available to receive the instruction, and (c) release instructions held at the Issue Queue to the queue in response to changing the virtual indicator from a second mode to a first mode.

12. The computer system of claim 11, wherein the Dispatch Unit is configured to dispatch the instruction to the Issue Queue with an entry location identifier that identifies the entry location in the queue to which the instruction is to be issued.

13. The computer system of claim 12, wherein the queue is in an execution unit of the processor and has between sixty-four and thirty three entry locations, and wherein the entry location identifier is a six bit field and the virtual indicator is a single wrap bit field.

14. The computer system of claim 10, wherein the Dispatch Unit is configured to indicate to the Issue Queue which region of the queue is available to receive instructions.

15. The computer system of claim 14, further comprising an Instruction Complete Table (ICT) to identify instructions that are complete, and wherein the Dispatch Unit has an instruction counter that is configured to count instructions dispatched on a per thread basis, and has a pointer identifying the oldest instruction completed, and wherein the execution unit is configured to identify completed instructions to the ICT and the ICT is configured to indicate to the Dispatch Unit the number of instructions that completed in a cycle, wherein in response to receiving information identifying the number of instructions completed in a cycle the Dispatch Unit moves its pointer, and in response to the pointer crossing a region boundary, the instructions in the region bounded by the region boundary are deallocated and available to receive new instructions.

16. The system of claim 10, wherein the system is further configured to deallocate and release entry locations in the queue on a region by region basis.

17. A computer system for processing information, the computer system comprising:
 at least one processor;
 a Dispatch Unit for dispatching instructions;
 an Issue Unit for receiving instructions dispatched from the Dispatch Unit and for issuing instructions;
 a queue of an execution unit for receiving instructions issued from the Issue Queue, the queue having a plurality of entry locations for storing data;
 one or more computer readable non-transitory storage media; and
 programming instructions stored on the one or more computer readable non-transitory storage media for execution by the at least one processor, the programming instructions comprising:
 programming instructions to dispatch instructions to the Issue Queue with a virtual indicator and a region identifier that identifies the region of the queue to which the instruction is to be issued, wherein the region comprises a plurality of entry locations with the queue;
 programming instructions to set the virtual indicator to a first mode for instructions dispatched where an entry location is available in the queue to receive the dispatched instruction, and the virtual indicator is set to a second mode for instructions dispatched where an entry is not available in the queue to receive the dispatched instruction;
 programming instructions to issue instructions to the queue in response to the virtual indicator being set to the first mode and to hold the instructions at the Issue Queue in response to the virtual indicator being set to the second mode;
 programming instructions to change the virtual indicator from a first mode to a second mode in response to the entry location in the queue being deallocated and available to receive an instruction; and
 programming instructions to deallocate and release entry locations in the queue on a region by region basis.

18. The computer system of claim 17, further comprising programming instructions to stamp instructions dispatched to the Issue Queue with an entry location identifier that identifies each entry location of the plurality of entry locations in the queue to which the instruction is to be issued.

* * * * *